(12) United States Patent
Sheridan et al.

(10) Patent No.: US 12,311,489 B2
(45) Date of Patent: May 27, 2025

(54) HANDLING TOOL

(71) Applicant: DDS INVESTMENTS, LLC, Junction City, KS (US)

(72) Inventors: Phillip L. Sheridan, Ellsworth, KS (US); Bryce W. Burris, Manhattan, KS (US)

(73) Assignee: DDS INVESTMENTS, LLC, Junction City, KS (US)

( * ) Notice: Subject to any disclaimer, the term of this patent is extended or adjusted under 35 U.S.C. 154(b) by 701 days.

(21) Appl. No.: 17/667,299

(22) Filed: Feb. 8, 2022

(65) Prior Publication Data
US 2023/0249305 A1    Aug. 10, 2023

(51) Int. Cl.
  *B23Q 7/04*    (2006.01)
  *B25J 9/10*    (2006.01)
  *B25J 15/00*   (2006.01)

(52) U.S. Cl.
  CPC .............. *B23Q 7/046* (2013.01); *B25J 9/102* (2013.01); *B25J 15/0028* (2013.01)

(58) Field of Classification Search
  CPC .... B25J 9/102; B25J 15/0004; B25J 15/0057; B25J 15/0226; B25J 15/0028; B23Q 3/1554; B23Q 7/04; B23Q 7/046; B23Q 2220/002; B23Q 7/045
  See application file for complete search history.

(56) References Cited

U.S. PATENT DOCUMENTS

| | | | |
|---|---|---|---|
| 3,999,664 A | 12/1976 | Frazier | |
| 4,458,566 A * | 7/1984 | Tajima | B25J 9/04 414/735 |
| 5,188,579 A | 2/1993 | Ruschle et al. | |
| 5,782,151 A * | 7/1998 | Shiramasa | B23Q 7/04 483/45 |
| 7,185,412 B2 | 3/2007 | Penick et al. | |
| 7,243,407 B2 | 7/2007 | Daris | |
| 8,092,357 B1 | 1/2012 | Buus | |
| 9,063,535 B2 | 6/2015 | Yanagita et al. | |
| 9,278,416 B2 | 3/2016 | Simons | |
| 9,352,451 B1 | 5/2016 | Warth et al. | |
| 9,718,160 B2 | 8/2017 | Simons | |
| 9,724,794 B1 | 8/2017 | Foster et al. | |
| 9,802,286 B2 | 10/2017 | Nishi et al. | |
| 10,307,877 B2 * | 6/2019 | Morimura | B23Q 11/005 |

(Continued)

FOREIGN PATENT DOCUMENTS

| | | |
|---|---|---|
| EP | 1935564 A1 | 6/2008 |
| EP | 2570208 A2 | 3/2013 |

(Continued)

OTHER PUBLICATIONS

Autodesk, Inc., Fundamentals of CNC Machining, 2014.

(Continued)

*Primary Examiner* — Stephen A Vu

(74) *Attorney, Agent, or Firm* — McAfee & Taft

(57) ABSTRACT

A handling tool for reorienting a workpiece in an interior of a CNC machine has a gripper assembly connected to a turret in the interior of the CNC machine. The gripper assembly is movable between closed and open positions to grip and release the workpiece and is rotatable about a longitudinal axis to reorient the workpiece in the interior of the CNC machine.

17 Claims, 11 Drawing Sheets

(56) References Cited

U.S. PATENT DOCUMENTS

| | | | |
|---|---|---|---|
| 10,343,246 | B1 | 7/2019 | Rowe et al. |
| 10,737,333 | B2 * | 8/2020 | Hayashi ............... B23B 29/242 |
| 10,864,674 | B2 | 12/2020 | Adair et al. |
| 11,027,417 | B2 | 6/2021 | Morimura |
| 2004/0103519 | A1 | 6/2004 | Walz |
| 2012/0152069 | A1 | 6/2012 | Hyatt et al. |
| 2017/0017226 | A1 | 1/2017 | Yamazaki |
| 2019/0219987 | A1 | 7/2019 | Kelkar |
| 2019/0232406 | A1 | 8/2019 | Predki |

FOREIGN PATENT DOCUMENTS

| | | |
|---|---|---|
| KR | 20110078537 A | 7/2011 |
| KR | 101117992 B1 | 3/2012 |
| RU | 35456 U1 | 1/2004 |

OTHER PUBLICATIONS

Turrets & Live Tooling, https://www.haascnc.com/productivityturret.html, retrieved Jul. 7, 2021.
Cellro Automation, "Loading CNC machines with robots: it's really simple," https://cellro.com/en/knowledgebase/loading-with-robots/, retrieved Jul. 7, 2021.
Images of prior art turrets (undated but admitted to be prior art).
Image of a prior art turret (undated but admitted to be prior art).
International Search Report and Written Opinion issued Apr. 14, 2023, in corresponding PCT Application No. PCT/US2023/012311.

* cited by examiner

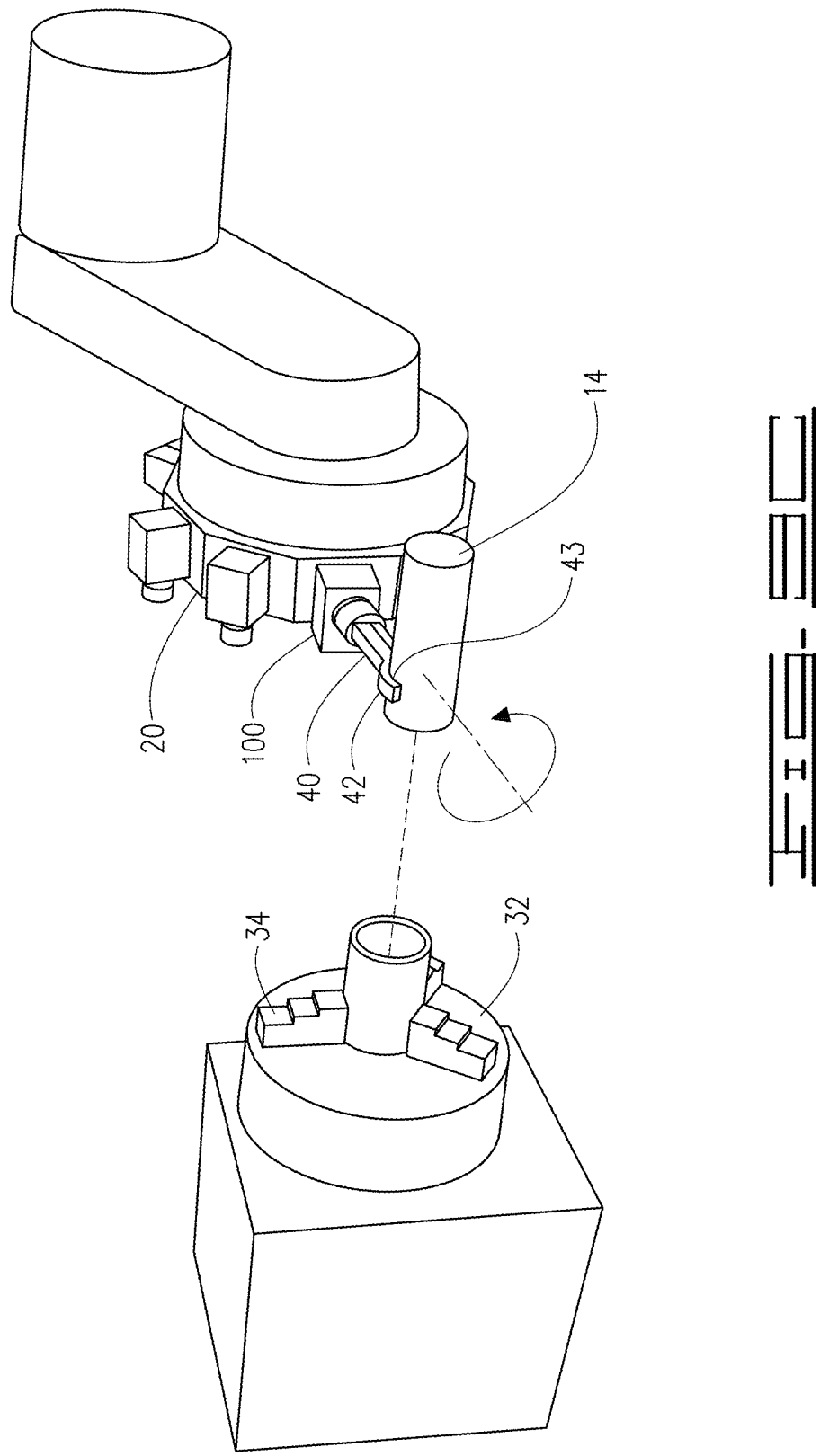

HANDLING TOOL

BACKGROUND

Computerized numerical control (CNC) machines can be used as lathes, mills, or both to fabricate parts from a workpiece. CNC machines may execute software instructions to control the operation of powered mechanical devices, such as electrical motors, and the operation of different tools to fabricate parts by selectively machining or removing material from a blank workpiece. While computer technology has facilitated certain operations, some CNC operations rely on human intervention. For example, workpieces may be loaded and unloaded manually in the CNC machine and may be reoriented manually as well.

In some cases, robots have been introduced into the fabrication process. To date robots are positioned outside the CNC machine. If a part being fabricated requires reorientation in the machine, access to the interior of the CNC machine is required to allow the robot on the exterior to reach into the CNC machine and perform the operations necessary to reorient the workpiece.

BRIEF DESCRIPTION OF THE DRAWINGS

FIG. 9B is a diagram showing the gripper assembly grasping and reorienting a workpiece.

FIG. 9C is a diagram showing the gripper assembly grasping and reorienting a workpiece.

DESCRIPTION OF A PREFERRED EMBODIMENT

Figure 1:
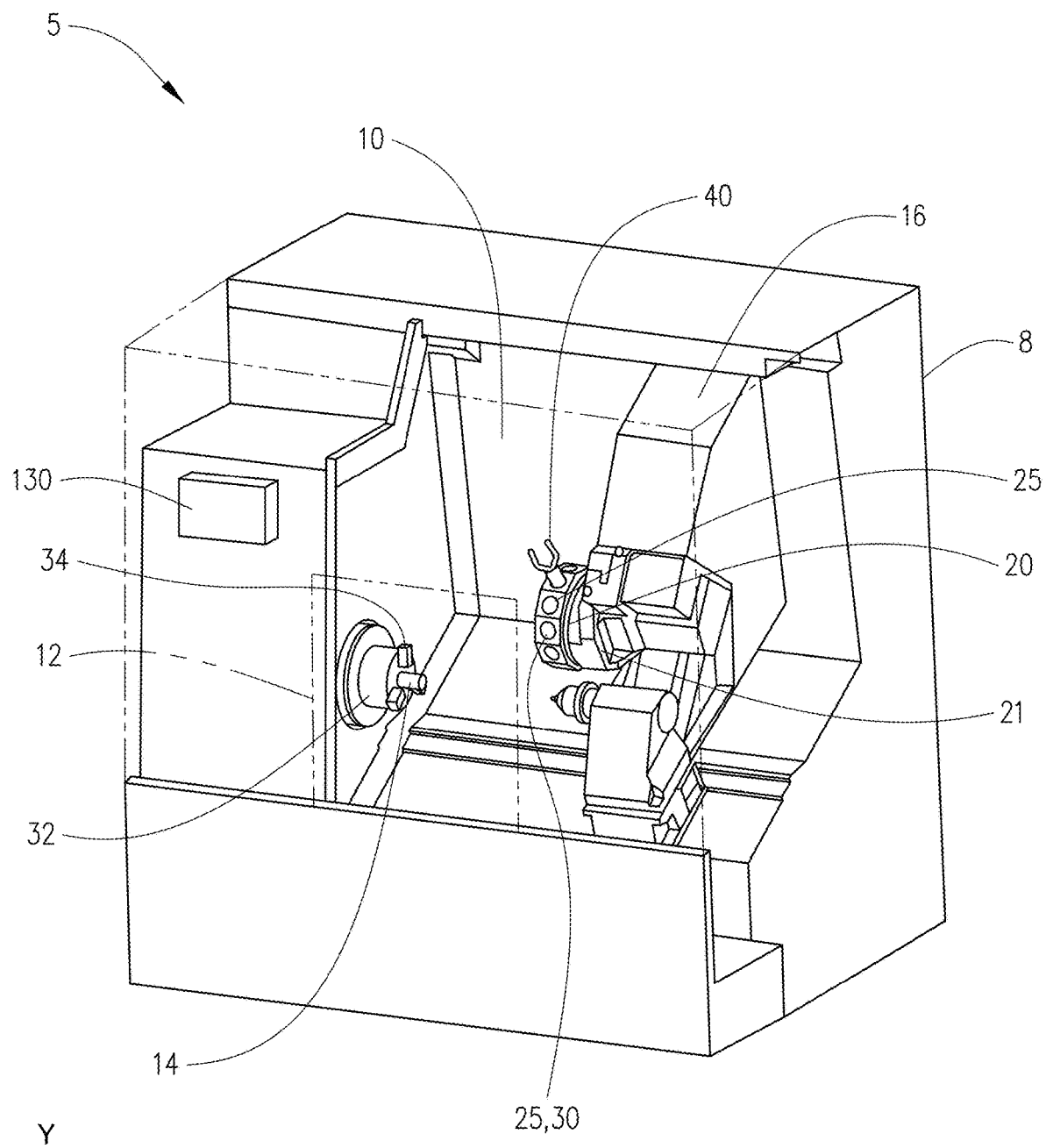
FIG. 1 is a perspective diagram of a CNC machine.
Figure 2:
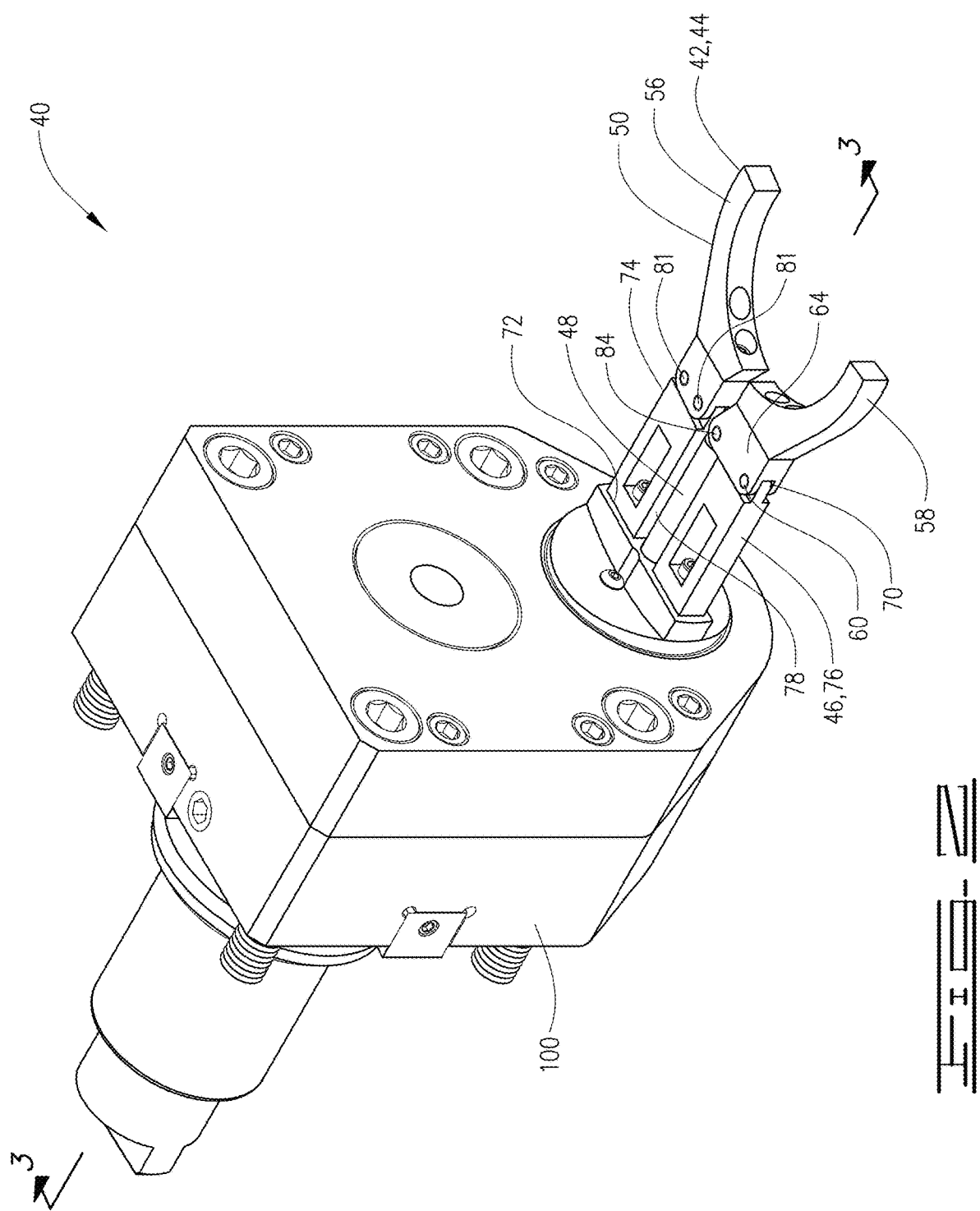
FIG. 2 is a perspective view of a handling tool with a gripper assembly.
Figure 3:
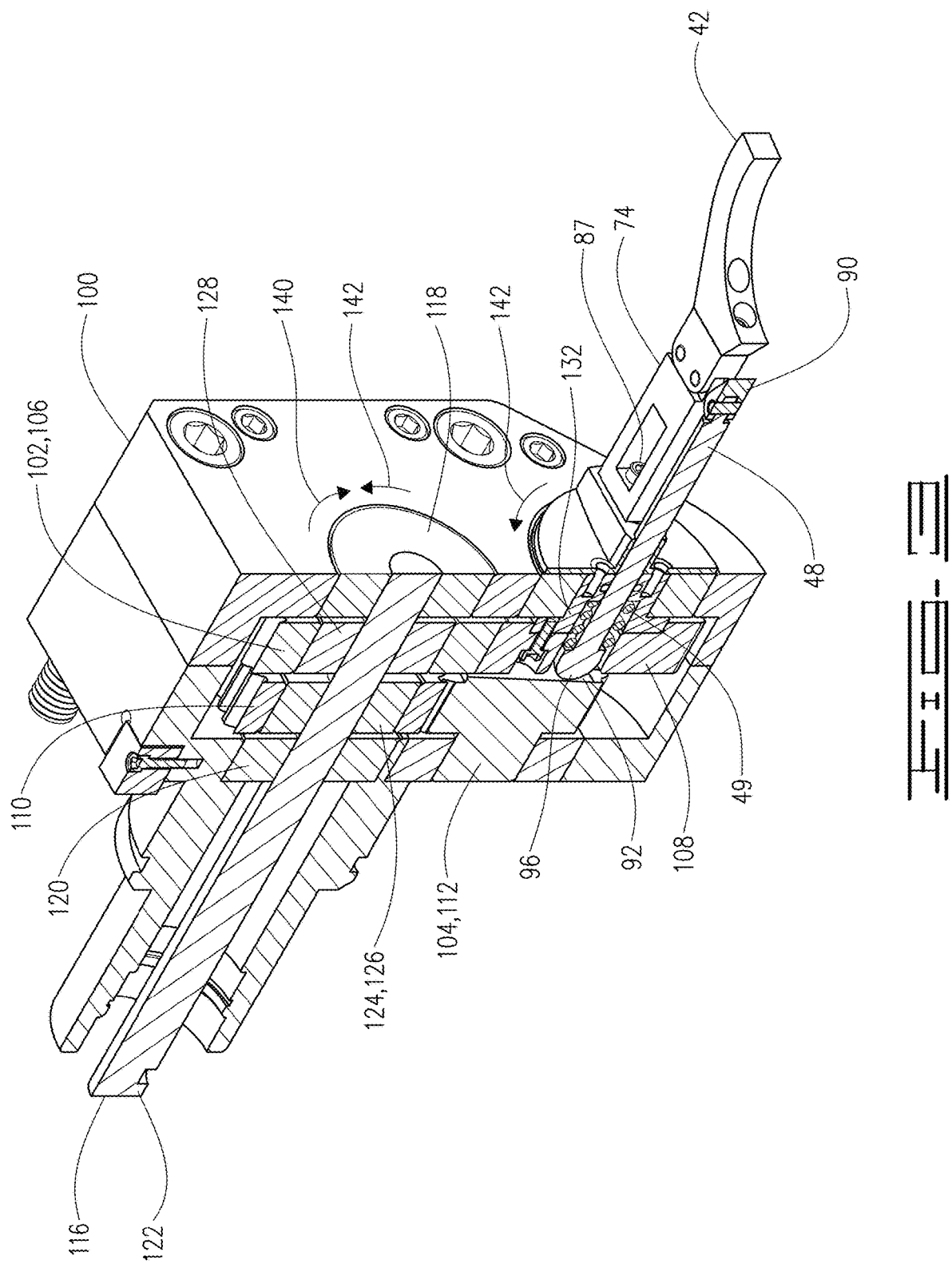
FIG. 3 is a cross section taken from line 3-3 of FIG. 2.
Figure 4:
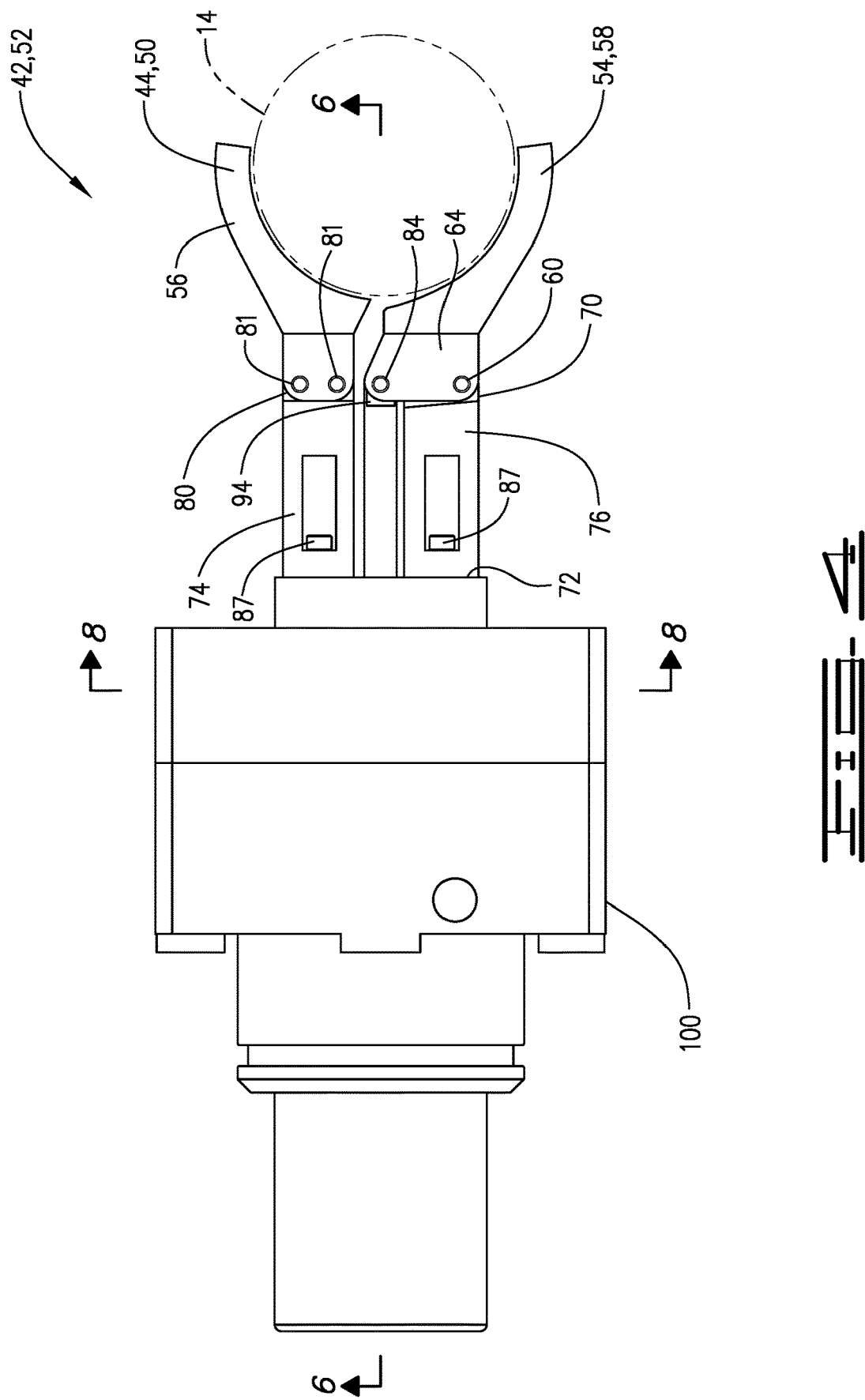
FIG. 4 is a top view of the gripper assembly in a closed position.

The current disclosure is directed to a handling tool that will grasp and reorient a workpiece in a computer numerical controlled (CNC) machine. The handling tool is connected to a turret inside the CNC machine, and as a result the reorientation of a workpiece is accomplished with no intervention from the exterior of the CNC machine by a human operator or a robot. A machine tool 5, which in one embodiment is a computer numerical controlled (CNC) machine 5 has a cabinet or enclosure 8 defining a machine interior 10. Machine interior 10 is normally fully enclosed when CNC machine 5 is in use. The drawing in FIG. 1 shows a portion of the cabinet in dashed lines to represent the entire enclosure 8. Enclosure 8 will normally have a door 12 therein which is openable and closeable and which may be utilized to allow an operator access to the interior 10 for a number of reasons such as placing a workpiece 14 therein so that the workpiece 14 may be machined in the interior 10.

CNC machine 5 includes a tool post 16 and a turret 20, which is a rotatable turret 20. Turret 20 is rotatable by a motor 21 which may be mounted in tool post 16. Rotatable turret 20 is movable with tool post 16. Turret 20 has a plurality of tool sockets 25 on an outer circumference or outer periphery 30 thereof. Rotation of the turret 20 allows the use of a desired tool positioned in one of the tool sockets 25. A workpiece spindle 32 is rotatably mounted in the interior 10 and has a workpiece holder 34. Workpiece holder 34 may be for example a chuck or collet system 34 for holding workpiece 14. CNC machines may be used for milling, as a lathe, or both. In the operation as a lathe, the workpiece spindle 32 will rotate (powered by a motor that is not shown) so that workpiece 14 held by chuck 34 may be worked on by a tool held in rotatable turret 20. The direction of movement of the various components may be explained with reference to the diagram shown in FIG. 1. The z-direction is left to right and right to left across the page, the y-direction is up and down, and the x-direction is orthogonal to the z-direction. Tool post 16 in the current embodiment will move in the x, y and z directions. The spindle 32 and chuck 34 rotate about a z-direction axis.

The current disclosure is directed to a handling tool 40 that is mountable to rotatable turret 20. Handling tool 40 is operable to grip workpiece 14 placed in chuck 34 and to remove the workpiece 14 from the chuck 34. Handling tool 40 may additionally reorient workpiece 14 by rotating the workpiece 14 to a desired orientation and then placing the workpiece 14 on the chuck 34 in the desired orientation. The handling tool 40 will then release the workpiece 14 and the turret 20 will move away from the workpiece spindle 32.

Figure 5:
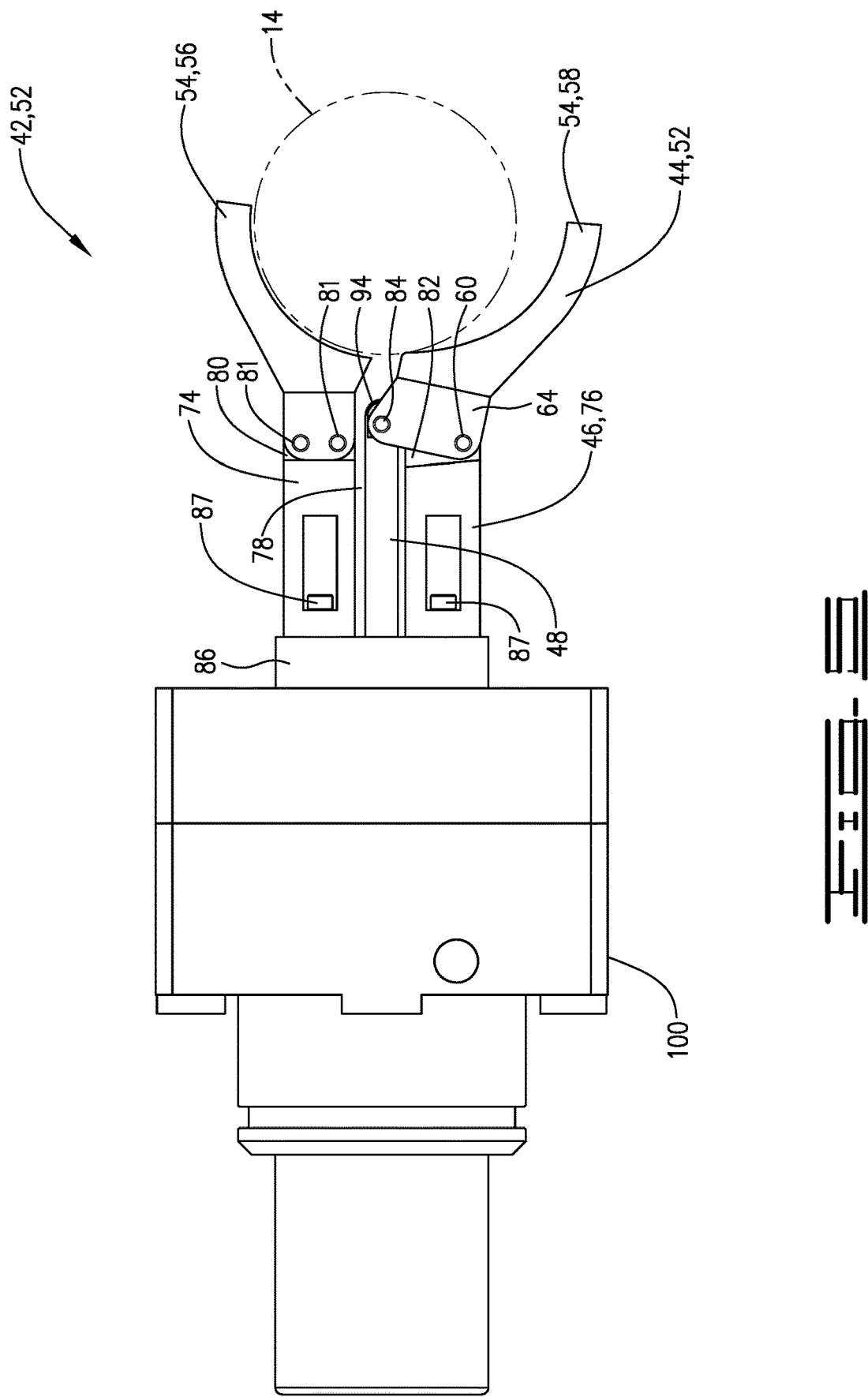
FIG. 5 is a top view of the gripper assembly in the open position.

Handling tool 40 comprises a gripper assembly 42. Gripper assembly 42 includes a gripper 44, a gripper stem 46 and an actuator 48, which in the embodiment shown is a linear actuator 48. Gripper 44 is movable between a closed or gripping position 50, which is the closed position of gripper assembly 42 to an open or releasing position 52 of gripper 44 which is the open position of gripper assembly 42. The open position is shown in FIG. 5. Gripper 44 comprises gripper fingers 54. Gripper fingers 54 include first and second gripper fingers 56 and 58, respectively. In the described embodiment, only the second gripper finger 58 is movable but it is understood that the first and second gripper fingers 56 and 58 may be movable. In the described embodiment gripper finger 58 is pivotally connected to gripper stem 46 with a pivot pin 60.

Gripper finger 58 has a gripper finger base 64 connected with fasteners or other means known in the art to gripper finger 58. Gripper finger base 64 is in turn pivotally connected to gripper stem 46 with pivot pin 60 such that gripper finger 58 is pivotably connected to gripper stem 46. Gripper stem 46 has a forward or first end 70 and a rear or second end 72. Gripper stem 46 comprises first and second stem segments 74 and 76. First and second stem segments 74 and 76 define a lateral space 78 therebetween.

First stem segment 74 has a tab 80. Pins or other fasteners 81 connect first stem segment 74 to gripper base 64 and thus to gripper finger 56 with pins 81. Second stem segment 76 has tab 82 through which a pivot pin 60 extends. Gripper finger 58 is pivotable about pivot pin 60 and thus will pivot radially outwardly to move the gripper assembly 42 from the closed position 50 to the open position 52.

A pin or other fastener 84 connects actuator 48 to base 64 of gripper finger 58. As a result, movement of linear actuator 48 causes gripper finger 58 to pivot about pin 60. A connecting block 86 is connected to the rear end 72 of gripper stem 46 at first and second stem segments 74 and 76 with a pair of fasteners 87.

Actuator 48 has forward end 90 and a rear end 92. An ear 94 at forward end 90 of actuator 48 is connected to gripper base 64 with pin 84 as previously described. An actuator head 96 at rear end 92 engages a rotatable gear. Rotation of the rotatable gear will cause linear movement of the linear actuator 48 as explained below. Linear actuator 48 moves between a retracted position in which the gripper assembly 42 is closed to an extended position as shown in FIG. 5 in which gripper assembly 42 is in the open position 52. A biasing member 49, which may be for example a compression spring, urges linear actuator 48 toward the retracted position.

Figure 7:
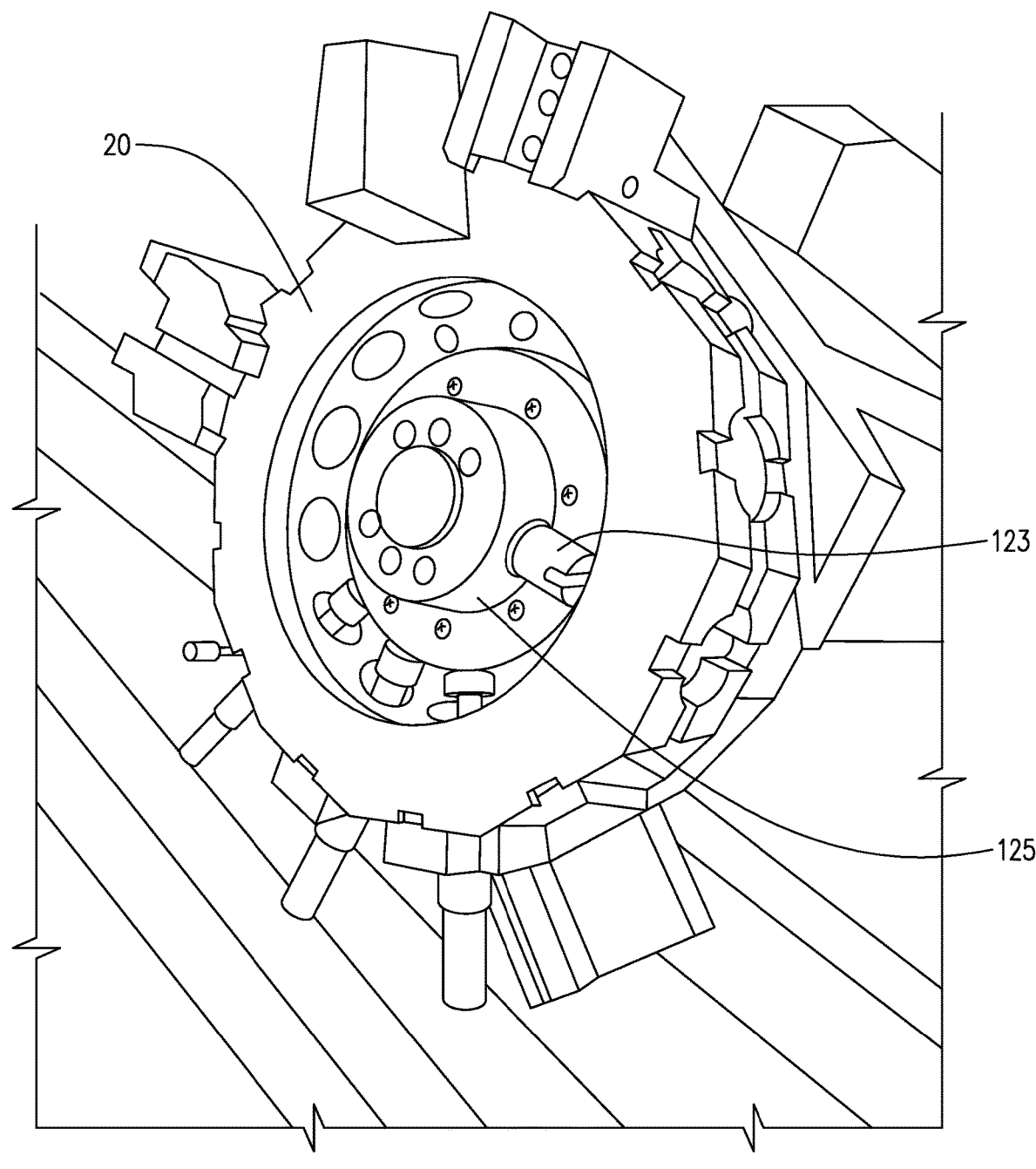
FIG. 7 is a diagram of an exemplary turret.
Figure 8:
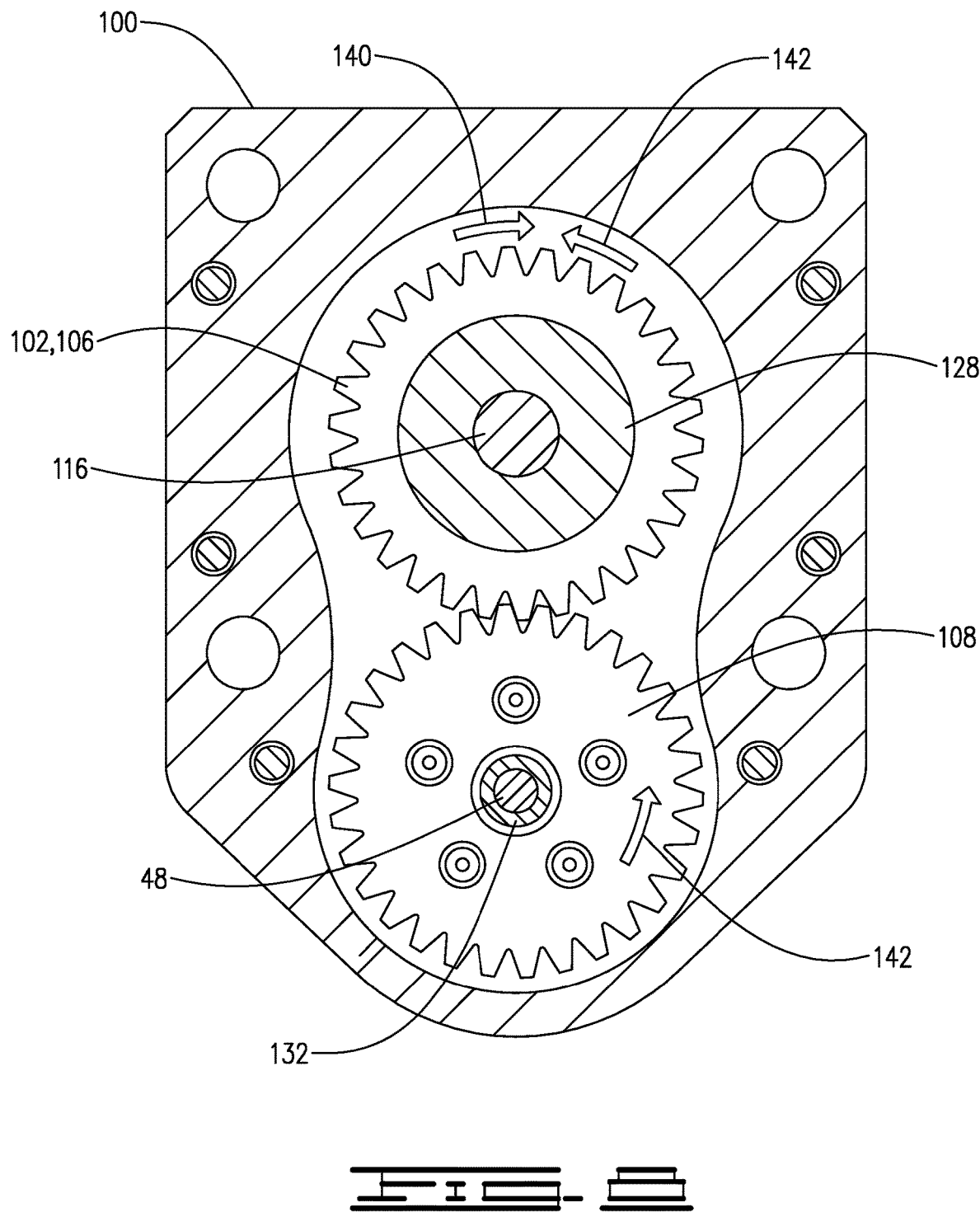
FIG. 8 is a cross section from line 8-8 of FIG. 4.

A handling tool housing 100 is connected to turret 20. First and second gear sets 102 and 104 are housed in handling tool housing 100. First gear set 102 comprises a first drive gear 106 and a first follower gear 108. Second gear set 104 comprises a second drive gear 110 and a second follower gear 112. A handling tool shaft 116 is rotatable in forward and rear bearings 118 and 120 that are fixed in handling tool housing 100. A rear end 122 of handling tool shaft 116 will connect to a turret drive member, such as for example turret drive dock 123. Turret drive dock 123 is rotatably driven by a turret spindle drive motor 125, which may be a part of and/or housed in tool post 16. Turret 20 shown in FIG. 7 is an exemplary diagram, and it is understood that there are a number of turret designs with different operational characteristics that may be used. The first and second drive gears 106 and 110 are mounted to shaft 116 with sprag bearings 124. First drive gear 106 is mounted with sprag bearing 126 and second drive gear 110 is mounted with sprag bearing 128. In one embodiment, the first gear set 102 and second gear set 104 have the same gear ratio, which may be for example, a 1:1 gear ratio. In other words, first drive gear 106 and first follower gear 108 have the same diameter and second drive gear 110 and second follower gear 112 have the same diameter. Other gear ratios are possible, and it is not necessary that the first and second drive gears have the same diameter, although in one embodiment they may.

A flanged bushing 132 comprising a bushing body 134 and a flange 136 is connected to connecting block 86. Flanged bushing 132 may be connected with fasteners 133 extending through connecting blocks 86 and into flanged bushing body 134. Flanged bushing 132 is in turn connected to first follower gear 108 with a fastener 137. Flanged bushing 132 is rotatable in a bearing 138 mounted in handling tool housing 100.

Sprag bearings 126 and 128 are mounted so that shaft 116 will rotate freely in one direction in the respective drive gear, but will engage and cause rotation of the respective drive gear when the shaft 116 is oppositely rotated. Rotation of drive shaft 116 in a first direction 140 will rotate first drive gear 106 in the first direction 140 in bearings 118 and 120. Drive shaft 116 will rotate freely in the first direction in sprag bearing 128 and thus will not create any rotational motion in second drive gear 110. Rotation of first drive gear 106 in the first direction 140 will cause rotation of first follower gear 108 in the second direction 142. Because first follower gear 108 is connected to flanged bushing 132 the rotation thereof will cause rotation of gripper assembly 42.

Figure 6:
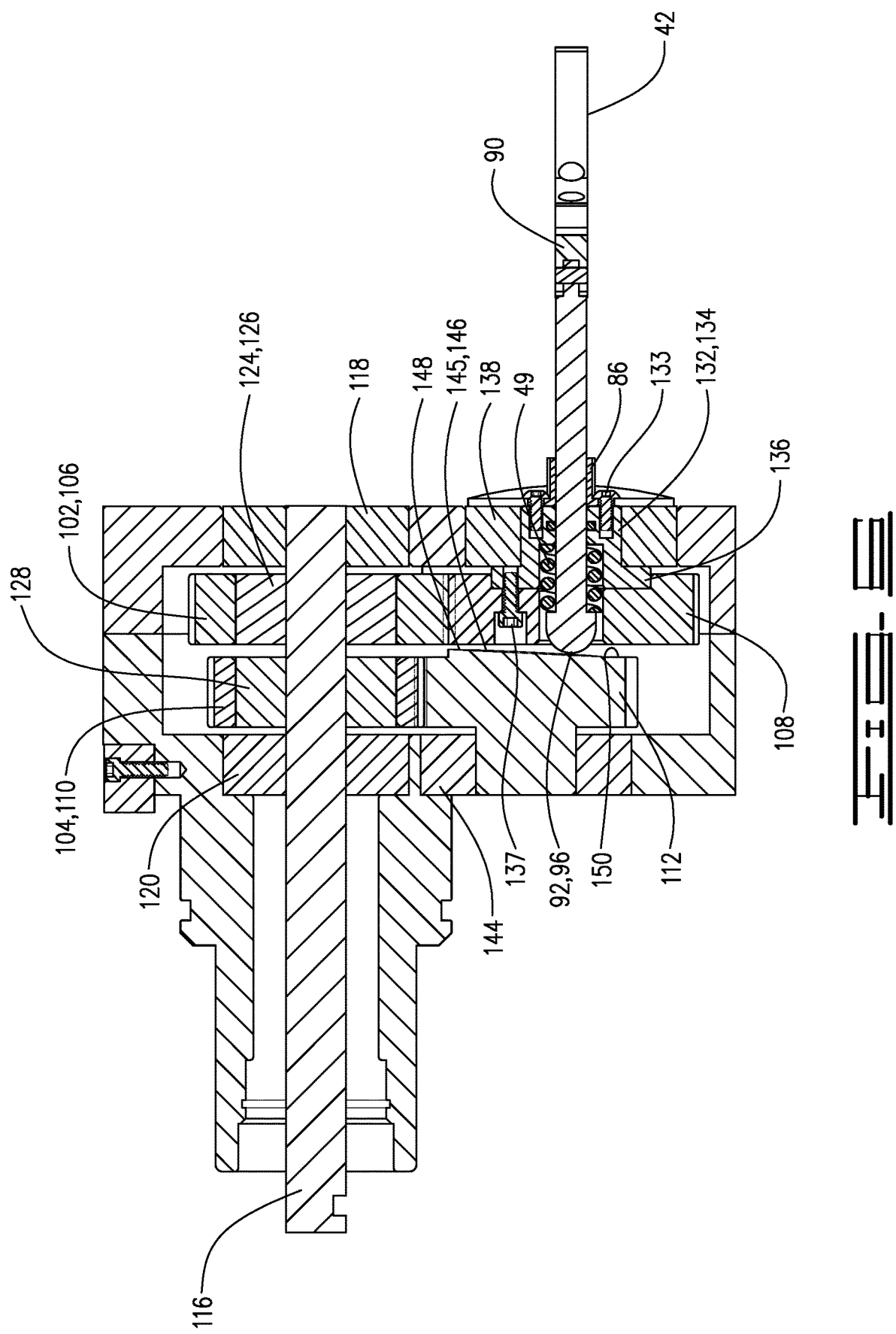
FIG. 6 is a cross section from line 6-6 of FIG. 4.

Rotation of handling tool drive shaft 116 in the second direction 142 will cause rotation in the second direction 142 of second drive gear 110. When shaft 116 is rotated in second direction 142, it will spin freely in sprag bearing 126 and thus will cause no rotation or movement of first drive gear 106. Rotation of second drive gear 110 in second direction 142 will cause rotation in the first direction 140 of second follower gear 112. Second follower gear 112 will rotate freely in a bearing 144 in handling tool housing 100. Second follower gear 112 has a camming surface 145. Camming surface 145 comprises forward face 146 of second follower gear 112 that is a sloped forward face 146. Forward face 146 has a high spot 148 and low spot 150. High spot 148 and low spot 150 are positioned 180° apart on forward face 146. When second follower gear 112 is rotated 180° from the position shown in FIG. 6, linear actuator 48 will be urged outwardly to an extended position which will cause second gripper finger 58 to rotate radially outwardly to place gripper assembly 42 in the open position 52. Rotating the second follower gear 180° when the gripper assembly is open and linear actuator 48 is extended will cause linear actuator 48 to move to the retracted position shown in FIG. 6 as a result of the force applied by biasing member 49.

In the described embodiment, CNC machine 5 is a CNC lathe with live tooling capabilities. "Live tooling" is a term well known in the art and is used in its common meaning herein. On a CNC lathe without live tooling, a main spindle rotates the chuck and the workpiece held therein, and the turret moves a stationary cutting tool held by the turret into engagement with the spinning workpiece to remove material therefrom. Live tooling on a lathe simply means that a turret spindle drive motor is operated with a CNC control device so that various operations may be performed on the workpiece while the workpiece is held in the chuck. Typical operations might be for example a drilling and tapping operation on the workpiece, or milling the workpiece with a rotary cutter attached to the turret. Generally, the live tooling operation involves a rotating tool driven by a turret spindle drive motor. The turret spindle drive motor will rotate the rotating tool through a gear or other arrangement. The rotating tool may be brought into engagement with the workpiece by moving the turret so that the live rotating tool contacts the workpiece while the workpiece is held stationary in the chuck. In the disclosed embodiment, the turret spindle drive motor 125 will rotate the handling tool drive shaft 116 to open and close gripper assembly 42 and to rotate the gripper assembly 42.

The operation of the CNC machine 5 is performed with a control device 130 which may be a part of the CNC machine 5 or may be remote therefrom. Control device 130 controls actuation of various components according to instructions from an operator. Control device 130 may comprise, for example, a CPU that executes various calculations and a memory that stores different control programs and parameters. Control device 130 may include a numerical control device that calculates the positions of the turret 20, a tool in the turret 20, the chuck 34 and workpiece 14 at all times. Control device 130 performs a number of other functions, such as communicating with other components, like the spindle 32, turret motor 21 and turret spindle drive motor 125 so that the operator can control the operation of such components. Control devices like that described are well known.

Figure 9A:
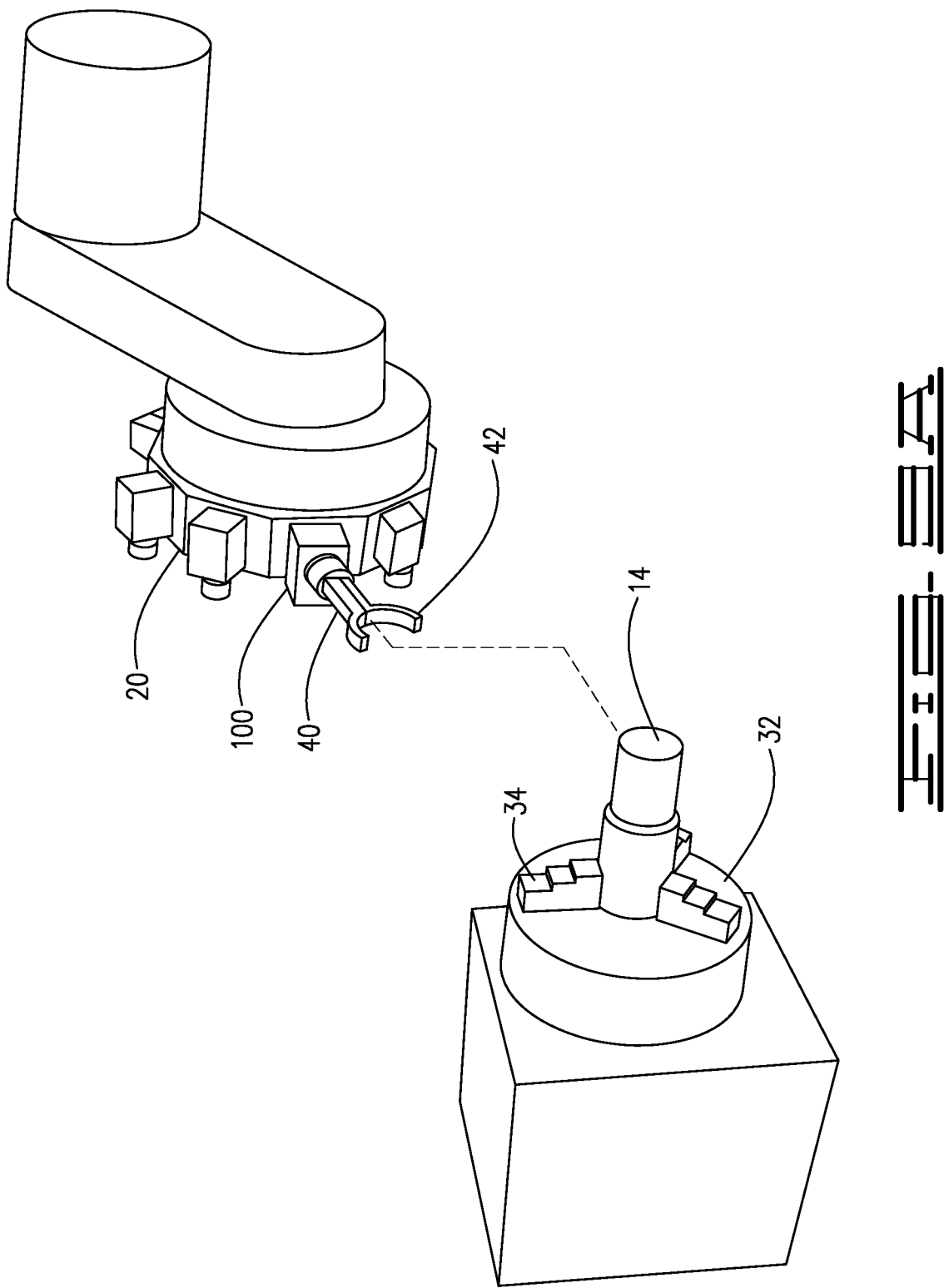
FIG. 9A is a diagram showing the handling tool connected to a turret.
Figure 11:
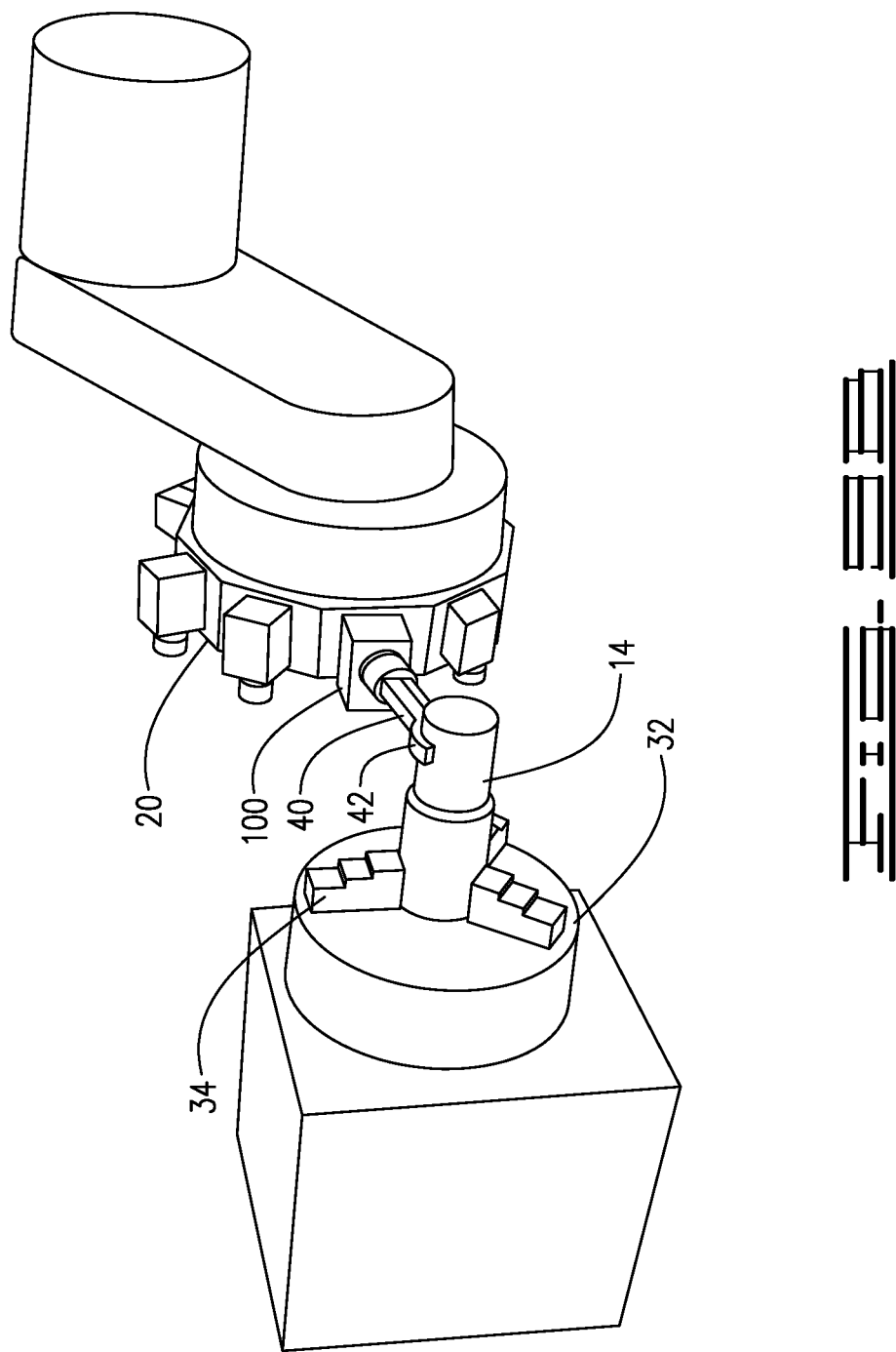

The operation of handling tool 40 includes attaching the handling tool 40 to the turret 20 and moving the turret in the x, z and/or y directions so that the gripper assembly 42 is located to grasp the workpiece 14. Movement in the x and z direction is standard on most machines, and the addition of movement in other directions, including y and others is, as noted above, referred to as live tooling. Handling tool 40 may be used in any CNC machine with live tooling, which may include 3-axis, 4-axis, 5-axis or more. Live tooling provides for the performance of more operations. FIG. 9A shows the workpiece 14 in chuck 34. The handling tool 40 is connected to turret 20. Gripper assembly 42 will be in the open position 52 prior to moving to the location of the workpiece 14. Once the gripper assembly 42 reaches the workpiece 14 location, the handling tool drive shaft 116 will be rotated by turret spindle drive motor 125 through connection with drive dock 123 in the turret 20. FIG. 7 is a view inside exemplary turret 20 with a forward face removed so that the drive dock 123 is shown. Drive dock 123 is connected to handling tool shaft 116 to rotate handling tool shaft 116 and operate gripper assembly 42. Drive dock 123 is driven by the turret spindle drive motor and can rotate in both clockwise and counter clockwise directions. Other arrangements for connection of the shaft 116 may be utilized. All that is required is that the connection be such that the shaft 116 is rotatable as a result of the connection.

Once the turret 20 and gripper assembly 42 are moved to grip workpiece 14, drive dock 123 is rotated in the second direction 142 to close gripper 44 around workpiece 14. Handling tool drive shaft 116 is rotated to rotate the second follower gear 180°. Actuator head 96 will follow the contour of camming surface 145 of second follower gear 112 so that biasing member 49 urges linear actuator 48 rearwardly to allow gripper 44 to move to the closed position around workpiece 14. The CNC machine 5 in some embodiments may be programmed so that upon sensing a specified resistance on gripper fingers 56 and 58, the rotation of drive dock 123 will stop and the gripper 44 will be in a closed position relative to the particular workpiece. In other words, the closed position is the position in which the grippers are sufficiently engaged to maintain a grip on the workpiece 14 so that it can the workpiece 14 can be removed from chuck 34, reoriented and then reinserted into chuck 34. FIG. 9B shows the gripper assembly in a closed position around workpiece 14.

Once the workpiece 14 is gripped and chuck 34 is opened, turret 20 is moved away from the workpiece spindle 32 and chuck 34. In one embodiment the turret 20 is moved in the z direction away from chuck 34, but may be moved in the x and y directions as well to make certain that when the workpiece 14 is rotated there is clearance from the chuck 34 such that no interference occurs. Movement in the chosen direction must simply be sufficient to allow clearance for the workpiece to be reoriented. Once the workpiece 14 has been moved away from the chuck 34 the turret spindle drive motor 125 is actuated to rotate the drive dock 123 and handling tool shaft 116 in the first direction 140 to reorient the workpiece in a desired orientation. In one disclosed embodiment, the gripper 44 and workpiece 14 held therein are rotated 180°. First drive gear 106 is rotated by handling tool shaft 116 which causes first follower gear 108 to rotate. Rotation of first follower gear 108 rotates flanged bushing 132 and gripper assembly 42. FIG. 9C shows the workpiece 14 rotated 180° from the position in which it was originally in chuck 34. Once the workpiece 14 is rotated to the desired orientation, the turret 20 is moved back to the proper location to position the workpiece in the chuck 34. The chuck 34 is closed around the workpiece 14 in a manner known in the art, and shaft 116 is rotated so that second drive gear 110 rotates second follower gear 112. Linear actuator 48 will move forward as a result of the rotation of second follower gear 112 to open gripper assembly 42 and release the workpiece 14. Once linear actuator 48 is moved forward to an extended position to release workpiece 14, the turret 20 can then be moved away from the workpiece 14. The turret 20 may then be rotated so that another tool can be used to perform a desired lathe, milling or other operation on the workpiece 14.

The movement of the turret 20 and operation of the handling tool 40 can be performed by most CNC machines using existing controls and commands. The CNC machine 5 will be programmed so that the chuck 34 and turret 20 locations, and the relationship thereto are known. Likewise, the size/shape of the workpiece 14 and the tool that is placed in the turret 20 will have known parameters, so that upon a given instruction, for example to perform a certain operation, the turret 20 will move to the proper location. As noted above the turret, handling tool, chuck, spindle, workpiece and other locations will be known and programmed into control device 130, as will the relationships between the various components. Thus, for example, a known location on the gripper assembly 42 may be the engagement point 43 on the gripper assembly 42. The location of engagement point 43 will be programmed into the control device 130 and when instructed by the CNC machine operator, the turret 20 will move so that the gripper assembly 42 is properly located relative to the engagement point 43 to grip the workpiece 14.

Most CNC machines will be programmed with G-codes and M-codes, both terms known in the art, to control the movement of the turret 20 and the operation of the spindle 32 and turret 20. Thus, for example, the CNC operator will know and input the G codes necessary to move the turret 20, along with gripper assembly 42, to the proper location to grip the workpiece 14. Because the CNC machine 5 has live tooling, M-codes may be used to control the workpiece spindle 32 and the turret spindle drive motor that rotates drive dock 123. Thus, an M-code that instructs the turret spindle drive motor 125 to rotate the drive dock 123 at a certain speed for a certain time period, and in a desired direction will operate to move the gripper assembly 42 between the open and closed positions and to rotate the gripper assembly 42. This may be for example the M-code used to rotate a drill bit or other tool, but the instructions will be to rotate at a slower speed, for a much shorter time period, only that necessary to rotate shaft 116 180°. If desired, a separate computer code may be written and programmed into the CNC machine to control the rotation of the handling tool shaft 116.

The rotation of the shaft 116 may also be accomplished by using a generic threading cycle that exists in most CNC machines. Utilizing a threading cycle an operator of the CNC machine can identify the angular positions of the shaft 116 and set the angular position to which the shaft 116 should rotate to accomplish both the opening and closing of the gripper 44 and the rotation thereof. The threading cycle can also be used to rotate the shaft 116 multiple times and set to stop at the desired position for either rotating or opening/closing the gripper 44. The software to perform the operations described are known to exist in most CNC machines that include live tooling.

Embodiments Include

Embodiment 1. A handling tool for reorienting a workpiece in an interior of a CNC machine comprising a gripper assembly connected to a turret in the interior of the CNC machine, the gripper assembly movable between closed and open positions to grip and release the workpiece and rotatable about a longitudinal axis to reorient the workpiece in the interior of the CNC machine.

Embodiment 2. The handling tool of embodiment 1, further comprising a handling tool drive shaft connected to a turret drive member, the handling tool drive shaft operable to rotate the gripper assembly about its longitudinal axis upon rotation of the handling tool drive shaft in a first direction and to move the gripper assembly between open and closed positions upon rotation of the handling tool drive shaft in a second direction.

Embodiment 3. The handling tool of embodiment 2 further comprising first and second drive gears mounted to the handling tool drive shaft; and first and second follower gears engaged with and rotatable by the first and second drive gears respectively, the first drive gear rotatable only in the first direction and the second drive gear rotatable only in the second direction.

Embodiment 4. The handling tool of either of embodiments 2 or 3, the gripper assembly comprising a gripper stem and a pair of gripper fingers, at least one of the pair of gripper fingers pivotably connected to the gripper stem.

Embodiment 5. The handling tool of embodiment 4 further comprising a linear actuator movable between retracted and extended positions upon rotation of the handling tool drive shaft in the second direction, the linear actuator operable to pivot the at least one of the gripper fingers relative to the gripper stem.

Embodiment 6. The handling tool of either of embodiments 4 or 5, wherein the pivoting of the at least one gripper finger moves the gripper assembly between the open and closed positions.

Embodiment 7. The handling tool of any of embodiments 3-6, further comprising a linear actuator engaged with a camming surface of the second follower gear, the linear actuator movable between extended and retracted positions upon rotation of the second follower gear.

Embodiment 8. A machine tool comprising a machine cabinet defining a machine interior and a tool turret positioned in the machine interior. A rotatable workpiece spindle is positioned in the machine interior and a gripper assembly is rotatably mounted to the tool turret, the gripper assembly movable between closed and open positions to grip and release the workpiece and rotatable to reorient the workpiece in the interior of the machine tool.

Embodiment 9. The machine tool of embodiment 8, further comprising a handling tool shaft connected to and rotatably driven by a turret spindle drive motor, the gripper assembly movable between the open and closed positions and rotatable about a longitudinal axis upon rotation of the handling tool shaft.

Embodiment 10. The machine tool of embodiment 9 further comprising a first drive gear connected to and rotatable by the handling tool shaft and a first follower gear rotatably engaged by the first drive gear. The gripper assembly comprises a gripper stem rotatable with the first follower gear and a pair of gripper fingers connected to the gripper stem and movable between closed and open positions.

Embodiment 11. The machine tool of either of embodiments 9 or 10 comprising first and second drive gears rotatable with the handling tool shaft; first and second follower gears rotatably engaged by the first and second drive gears respectively and a linear actuator in contact with a sloped face of the second follower gear.

Embodiment 12. The machine tool of embodiment 11, wherein rotation of the second follower gear moves the linear actuator between extended and retracted positions.

Embodiment 13. The machine tool of embodiment 12, the gripper assembly movable between open and closed positions upon movement of the linear actuator between the extended and retracted positions.

Embodiment 14. The machine tool of embodiment 8, further comprising a handling tool drive shaft rotatably connected to the turret and a first drive gear rotatable with the handling tool drive shaft. A first follower gear is rotatably engaged by the first drive gear. A second drive gear is rotatable with the handling tool drive shaft and a second follower gear is rotatably engaged by the second drive gear, the gripper assembly rotatable by rotation of the first follower gear and movable between the open and closed positions by rotation of the second follower gear.

Embodiment 15. The machine tool of embodiment 14, the first drive gear rotatable only in a first direction and the second drive gear rotatable only in a second direction.

Embodiment 16. A handling tool for use in a CNC machine to grip and reorient a workpiece in the interior of a CNC machine comprising a handling tool housing connected to a turret in the interior of the CNC machine. A rotatable handling tool shaft is positioned in the handling tool housing. First and second drive gears are rotatably mounted to the handling tool shaft and first and second follower gears rotatably engaged with the first and second drive gears respectively. A gripper assembly is movable between a closed position in which the gripper assembly grasps the workpiece and an open position in which the gripper releases the workpiece and the handling tool shaft is rotatable in first and second directions. The gripper assembly is movable between the open and closed positions as a result of rotation of the handling tool shaft in the first direction and the gripper assembly is rotatable around a longitudinal axis upon rotation of the handling tool shaft in the second direction.

Embodiment 17. The handling tool of embodiment 16, the gripper assembly comprising a gripper stem connected to the handling tool housing and a gripper connected to the gripper stem and movable between open and closed positions.

Embodiment 18. The handling tool of embodiment 17 further comprising a linear actuator engaged with a forward face of the second follower gear and movable between extended and retracted positions to move the gripper between open and closed positions.

Embodiment 19. The handling tool of embodiment 18, the forward face of the second follower gear comprising a sloped forward face.

Embodiment 20. The handling tool of any of embodiments 16-19, the first drive gear rotatable only in the first direction and the second drive gear rotatable only in the second direction.

What is claimed is:

1. A handling tool for reorienting a workpiece in an interior of a CNC machine comprising:
    a gripper assembly connected to a turret in the interior of the CNC machine, the gripper assembly movable between closed and open positions to grip and release the workpiece and rotatable about a longitudinal axis to reorient the workpiece in the interior of the CNC machine; and
    a handling tool drive shaft connected to a turret drive member, the handling tool drive shaft operable to rotate the gripper assembly about its longitudinal axis upon rotation of the handling tool drive shaft in a first direction and to move the gripper assembly between open and closed positions upon rotation of the handling tool drive shaft in a second direction.

2. The handling tool of claim 1 further comprising:
    first and second drive gears mounted to the handling tool drive shaft; and
    first and second follower gears engaged with and rotatable by the first and second drive gears respectively, the first drive gear rotatable only in the first direction and the second drive gear rotatable only in the second direction.

3. The handling tool of claim 2, further comprising a linear actuator engaged with a camming surface of the second follower gear, the linear actuator movable between extended and retracted positions upon rotation of the second follower gear.

4. The handling tool of claim 1, the gripper assembly comprising:
a gripper stem; and
a pair of gripper fingers, at least one of the pair of gripper fingers pivotably connected to the gripper stem.

5. The handling tool of claim 4 further comprising a linear actuator movable between retracted and extended positions upon rotation of the handling tool drive shaft in the second direction, the linear actuator operable to pivot the at least one of the gripper fingers relative to the gripper stem.

6. The handling tool of claim 4, wherein the pivoting of the at least one gripper finger moves the gripper assembly between the open and closed positions.

7. A machine tool comprising:
a machine cabinet defining a machine interior;
a tool turret positioned in the machine interior;
a rotatable workpiece spindle positioned in the machine interior;
a gripper assembly rotatably mounted to the tool turret, the gripper assembly movable between closed and open positions to grip and release the workpiece and rotatable to reorient the workpiece in the interior of the machine tool;
a handling tool shaft connected to and rotatably driven by a turret spindle drive motor, the gripper assembly movable between the open and closed positions and rotatable about a longitudinal axis upon rotation of the handling tool shaft;
first and second drive gears rotatable with the handling tool shaft;
first and second follower gears rotatably engaged by the first and second drive gears respectively; and
a linear actuator in contact with a sloped face of the second follower gear.

8. The machine tool of claim 7, wherein rotation of the second follower gear moves the linear actuator between extended and retracted positions.

9. The machine tool of claim 8, the gripper assembly movable between open and closed positions upon movement of the linear actuator between the extended and retracted positions.

10. A machine tool comprising:
a machine cabinet defining a machine interior;
a tool turret positioned in the machine interior;
a rotatable workpiece spindle positioned in the machine interior; and
a gripper assembly rotatably mounted to the tool turret, the gripper assembly movable between closed and open positions to grip and release the workpiece and rotatable to reorient the workpiece in the interior of the machine tool;
a handling tool drive shaft rotatably connected to the turret;
a first drive gear rotatable with the handling tool drive shaft;
a first follower gear rotatably engaged by the first drive gear;
a second drive gear rotatable with the handling tool drive shaft; and
a second follower gear rotatably engaged by the second drive gear, the gripper assembly rotatable by rotation of the first follower gear and movable between the open and closed positions by rotation of the second follower gear.

11. The machine tool of claim 10, the first drive gear rotatable only in a first direction and the second drive gear rotatable only in a second direction.

12. A handling tool for use in a CNC machine to grip and reorient a workpiece in the interior of a CNC machine comprising:
a handling tool housing connected to a turret in the interior of the CNC machine;
a rotatable handling tool shaft positioned in the handling tool housing;
first and second drive gears rotatably mounted to the handling tool shaft;
first and second follower gears rotatably engaged with the first and second drive gears respectively;
a gripper assembly movable between a closed position in which the gripper assembly grasps the workpiece and an open position in which the gripper releases the workpiece; and
the handling tool shaft rotatable in first and second directions, the gripper assembly movable between the open and closed positions as a result of rotation of the handling tool shaft in the first direction and the gripper assembly rotatable around a longitudinal axis upon rotation of the handling tool shaft in the second direction.

13. The handling tool of claim 12, the gripper assembly comprising:
a gripper stem connected to the handling tool housing; and
a gripper connected to the gripper stem and movable between open and closed positions.

14. The handling tool of claim 13 further comprising a linear actuator engaged with a forward face of the second follower gear and movable between extended and retracted positions to move the gripper between open and closed positions.

15. The handling tool of claim 14, the forward face of the second follower gear comprising a sloped forward face.

16. The handling tool of claim 12, the first drive gear rotatable only in the first direction and the second drive gear rotatable only in the second direction.

17. A machine tool comprising:
a machine cabinet defining a machine interior;
a tool turret positioned in the machine interior;
a rotatable workpiece spindle positioned in the machine interior;
a gripper assembly rotatably mounted to the tool turret, the gripper assembly movable between closed and open positions to grip and release the workpiece and rotatable to reorient the workpiece in the interior of the machine tool;
a handling tool shaft connected to and rotatably driven by a turret spindle drive motor, the gripper assembly movable between the open and closed positions and rotatable about a longitudinal axis upon rotation of the handling tool shaft;
a first drive gear connected to and rotatable by the handling tool shaft;
a first follower gear rotatably engaged by the first drive gear; and
the gripper assembly comprising:
a gripper stem rotatable with the first follower gear; and
a pair of gripper fingers connected to the gripper stem and movable between closed and open positions.

* * * * *